United States Patent [19]

Forney

[11] Patent Number: 5,044,264
[45] Date of Patent: Sep. 3, 1991

[54] COOKING APPARATUS FOR PRODUCING GRILL STRIPES ON COOKED PRODUCTS

[76] Inventor: Robert B. Forney, P.O. Box AI, Tiburon, Calif. 94920

[21] Appl. No.: 646,871

[22] Filed: Jan. 28, 1991

[51] Int. Cl.[5] .................... A47J 37/00; A47J 37/04
[52] U.S. Cl. .................................. 99/349; 99/386; 99/388; 99/400; 99/423; 99/425; 99/433 C; 99/446; 99/391
[58] Field of Search .............. 99/349, 386, 387, 388, 99/391, 393, 400, 423, 443 C, 444–446, 477, 427, 425, 426, 373, 352, 353; 101/11, 31

[56] References Cited

U.S. PATENT DOCUMENTS

| | | | |
|---|---|---|---|
| 3,589,274 | 6/1971 | Murray | 99/423 X |
| 3,646,879 | 3/1972 | Palmason et al. | 99/446 |
| 3,963,452 | 9/1972 | McGinley et al. | 99/386 |
| 3,965,807 | 6/1976 | Baker | 99/386 |
| 4,072,092 | 2/1978 | Kohli et al. | 99/443 C |
| 4,197,792 | 4/1980 | Mendoza | 99/349 |
| 4,297,942 | 11/1981 | Benson et al. | 99/388 |
| 4,433,621 | 2/1984 | Van Wyk et al. | 101/11 |
| 4,444,094 | 4/1984 | Baker et al. | 99/391 |
| 4,488,480 | 12/1984 | Miller et al. | 99/390 |
| 4,667,589 | 5/1987 | Bishop | 99/395 |

FOREIGN PATENT DOCUMENTS 2464650  4/1981  France ........................... 99/349

Primary Examiner—Timothy F. Simone
Attorney, Agent, or Firm—Thomas M. Freiburger

[57] ABSTRACT

A belt grill or belt cooking apparatus, of the general type previously known for rapidly cooking meat, grilled sandwiches, etc. in a travelling path through the apparatus, has improvements enabling the belt cooking grill to impart grill stripes or grill patterns on the product as it is cooked. In one embodiment the improved belt cooking apparatus has upper and lower heat platens with ridges or other types of embossings, with the moving belts being formed of a flexible material capable of good heat transfer and good wear resistance at elevated temperatures. The ridges or embossings press the belt into the food product, causing greater heat transfer at the ridges than between them, and thus forming a series of grill stripes on the product while the product is also cooked. In another embodiment, the belts are formed of stainless steel, with corrugations, embossings or ridges which press directly against the moving feed product as it is cooked, to effect grill stripes due to greater heat transfer along the lines of pressure.

11 Claims, 2 Drawing Sheets

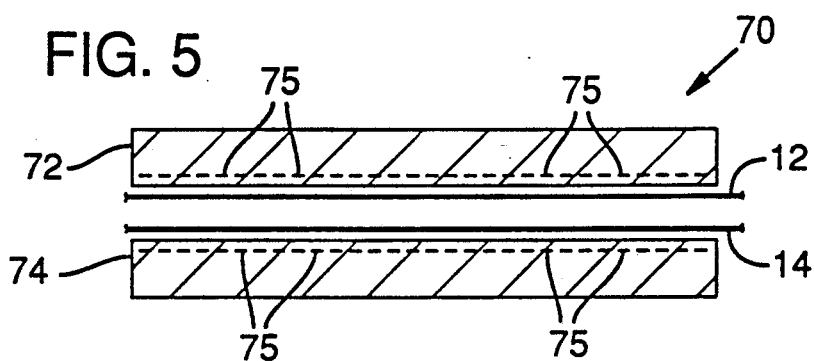
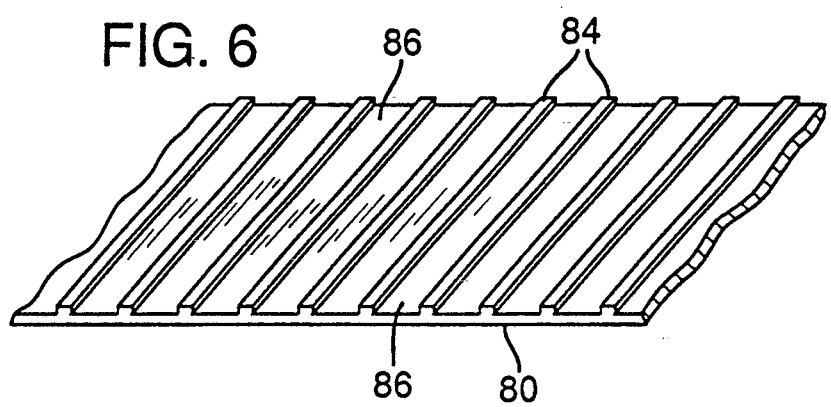
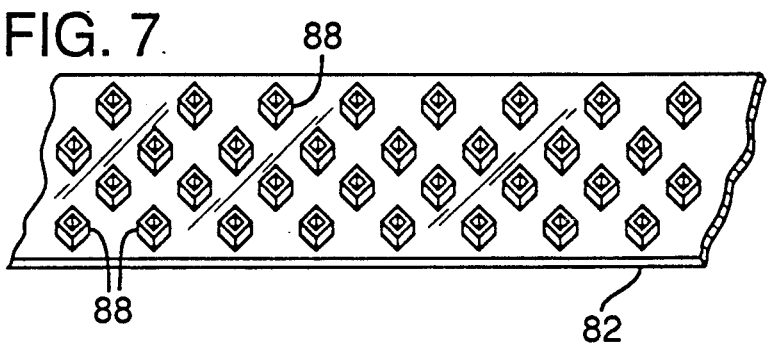
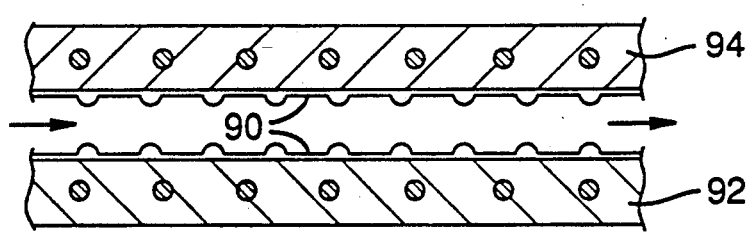
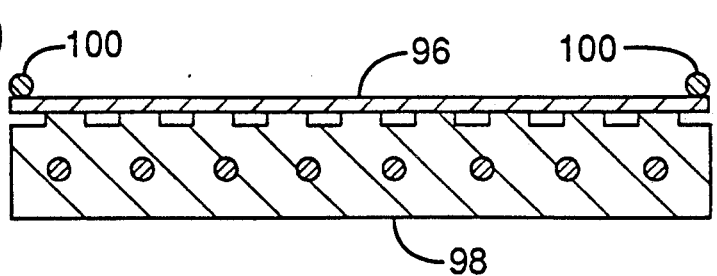

COOKING APPARATUS FOR PRODUCING GRILL STRIPES ON COOKED PRODUCTS

BACKGROUND OF THE INVENTION

The invention is concerned with cooking food products, especially on a commercial basis. More specifically the invention is concerned with a belt grill or belt cooking apparatus, with improved structure enabling the formation of grill stripes or patterns in the food product while it is being cooked in the belt grill.

Belt cooking devices known as belt grills have been known and used, particularly for commercial cooking of products such as hamburgers, sausage patties, chicken and fish filets, steaks, chops, french toast, cheese sandwiches, pancakes and other food products. Cooking is effected by heat conduction to both sides of the food product, the heat being conducted through moving belts with heated platens behind them. A belt grill device is disclosed in Norris U. S. Pat. No. 3,646,880.

In general, a belt grill comprises upper and lower heated platens arranged in generally parallel planes, with two opposed belts of flexible heat resistant and heat conducting material conveyed in contact with the hot platens. The belts typically have been Teflon laminated over a fiberglass fabric. The product is placed on the lower Teflon belt at an entry end, and is sandwiched between the upper and lower conveyor belts as it advances, with both belts moving at the same speed. As the food product progresses, it is engaged with some pressure between the belts, each belt being backed up by a hot plate which conducts heat through the belt into the item being cooked.

In such belt grills, generally the upper platen and belt can be raised and lowered to accommodate various thicknesses of products to be cooked. Further, the separation between the belts and platens may be set to vary along the product path, becoming narrower toward the outlet end to accommodate shrinkage of food products during cooking.

The platens as well as the belts on such known belt grills have smooth and regular surfaces, so that the food products are engaged by and travel between generally planar surfaces.

In the case of certain food products it is desirable to have grill marks or grill stripes on the cooked product, to enhance the appearance of the product to the consumer. Such products include hamburger, pork, chicken patties, ham, beef, lamb, steaks, chops, fish and chicken filets and some sandwiches. Conventional belt grills are intended to establish uniform cooking of a product, and do not have any provision for the formation of grill marks in the surfaces of products.

Wallick et al. Pat. No. 4,373,431 disclosed a wiener cooking conveyor device having a heated grill which contacts the wieners as the wieners move in a conveyed path. The wieners rotated through one revolution as they were rolled against the heated grill, so as to form circumferential grill stripes around the tubular wieners. The disclosed device in the Wallick et al. patent did not utilize or have any relationship to a belt cooking device as described above.

U. S. Pat. Nos. 4,089,260 (Brown and Forney), 4,297,942 (Benson et al.) and 4,433,621 (Van Wyk et al.) disclosed various other arrangements for forming browning, searing or grill marks on meat products as the products are moved by conveyor means. These have involved either hot gases contacting the surfaces of the meat products, heated metal brands or bars, or both. None involved or contemplated the principles of the present invention described below.

SUMMARY OF THE INVENTION

In accordance with the present invention, a belt grill cooking apparatus of the general type described above is made capable of forming grill stripes, other types of grill lines or brand marks in a food product which is also being cooked a it travels in a linear path through the belt cooking device.

In one form of the invention, a belt grill or belt cooking apparatus of the general type previously known for rapidly cooking meat, grilled sandwiches, etc. in a travelling path through the apparatus, has improvements enabling the belt cooking grill to impart grill stripes or grill patterns on the product as it is cooked. In one embodiment the improved belt cooking apparatus has upper and lower heat platens with ridges or other types of embossings, with the moving belts being formed of a flexible material capable of good heat transfer and good wear resistance at elevated temperatures. The ridges or embossings press the belt into the food product, causing greater heat transfer at the ridges than between them and thus forming a series of grill stripes on the product while the product is also cooked.

In another embodiment the platens may be relatively flat, but with series of longitudinal heat elements inside the platens near the surface, which can be selectively activated so as produce grill lines when desired.

In still another embodiment, the belts are formed of stainless steel, with corrugations, embossings or ridges which press directly against the moving food product as it is cooked, to effect grill stripes due to greater heat transfer along the lines of pressure. A Teflon or Kaptron layer may be laminated onto the stainless steel belt, and a similar lamination may be on the surfaces of the heat platens.

In one specific embodiment, a stainless steel belt has embossings or raised patterns in the shape of brand marks which may, for example, represent a trademark of a restaurant serving the cooked food product.

It is therefore among the objects of the present invention to enhance the performance and expand the functionality of a belt grill or belt cooking device by providing a belt grill with structure which will establish greater heat transfer from the heat platens to specific lines or patterns in the surface of the food product being cooked, so as to form grill stripes or brands, while still providing for the cooking of the product as it progresses through the belt grill. These and other objects, advantages and features of the invention will be apparent from the following description of preferred embodiments, considered along with the accompanying drawings.

DESCRIPTION OF THE DRAWINGS

FIG. 5 is another similar transverse cross sectional view, illustrating a further modification.

FIG. 6 is a fragmentary view in perspective, showing a stainless steel belt with ridges or embossings, for use in a belt cooking apparatus of the invention.

FIG. 7 is a perspective view similar to FIG. 6, but showing a modified pattern of embossings.

FIG. 8 is a longitudinal cross sectional view schematically indicating a belt grill with another form of stainless steel belt.

FIG. 9 is a transverse cross sectional view schematically indicating a belt grill having provision for trapping of rendered fats.

DESCRIPTION OF PREFERRED EMBODIMENTS

Figure 1:
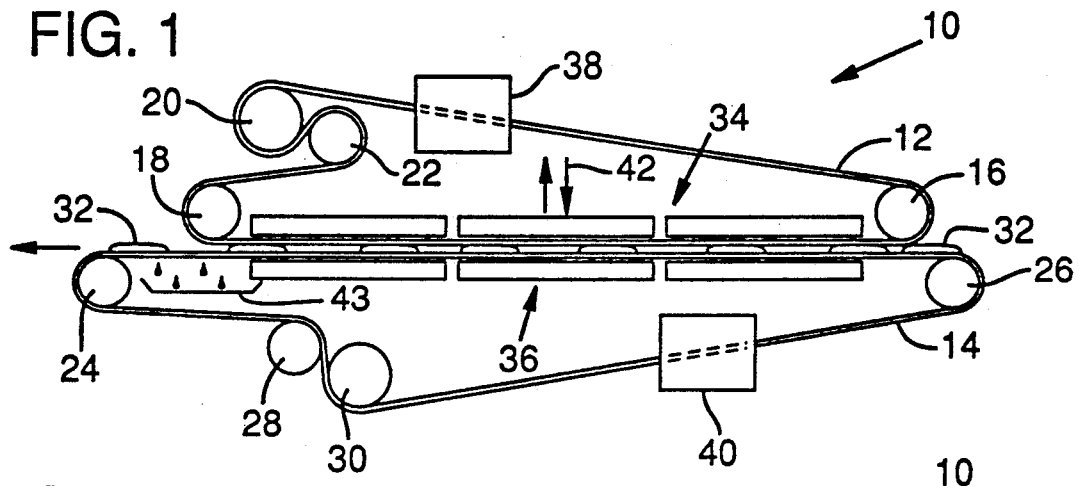
FIG. 1 is a schematic side elevation view showing a belt grill or belt type cooking apparatus which may incorporate the subject matter of the present invention.

In the drawings, FIG. 1 shows a belt grill or belt type cooking apparatus 10 which can incorporate grill striping or branding in accordance with the principles of the invention. The belt grill 10 has a pair of upper and lower belts 12 and 14 mounted on belt rollers 16, 18, 20, 22, 24, 26, 28 and 30. Both belts pass through a generally horizontal path wherein the belts are generally parallel and spaced apart an appropriate distance for cooking food products 32 between them. Behind each belt in this area is a heated platen or platen assembly 34 (upper platen) and 36 (lower platen). In FIG. 1 the platens 34 and 36 are illustrated schematically as being divided into three sections longitudinally, but they can be divided into more sections or they can be unitary if desired. Generally a divided platen assembly has its sections abutted together to present a continuous surface.

Also, FIG. 1 is only schematic in its representation of the relationship between the platens and the belts 12 and 14; the platens are in contact with the back sides of the belts, and in fact with a small amount of pressure, since the food products 32 are sandwiched between the belts and platens with slight pressure to better conduct heat from both the upper and lower heat platens into the food product.

FIG. 1 also schematically indicates belt cleaners at 38 and 40, in the return portions of the belts. Further, arrows 42 indicate that the upper platen/belt assembly can be adjusted upwardly or downwardly so as to enable selection of the proper separation between the two belts along the cooking path. This adjustment can include provision for variable separation along the path, so that shrinkage of food products during cooking can be accommodated by having the belts closer at the exit end than at the entry end.

In accordance with the invention, in some embodiments the lower belt 14 can comprise an open mesh or a perforated belt of reinforced Teflon or Kaptron, for example. Openings of about 1/16" or ⅛" will allow rendered fat to fall down through the belt after passing the end of the lower platen assembly 36, into a collection tray 43.

Figure 2:
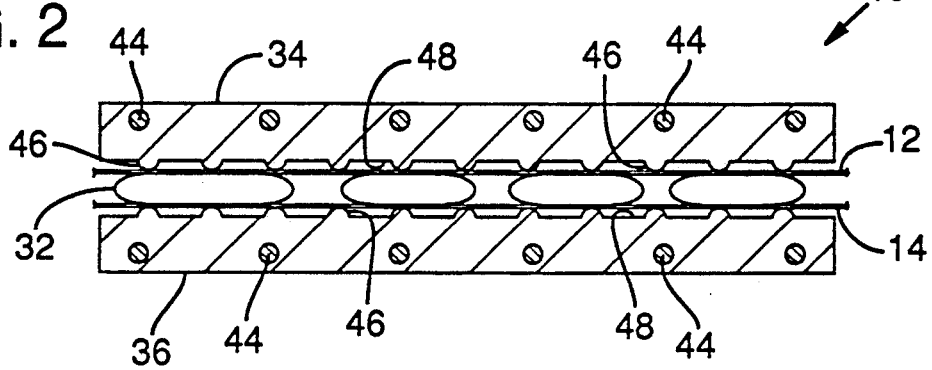
FIG. 2 is a somewhat schematic transverse cross sectional view showing heat platens and flexible belts of a belt grill of the present invention, with food product positioned between the belts.

FIG. 2 is a schematic representation of the cooking path of the belt grill assembly 10, in transverse cross sectional view. In FIG. 2 the upper and lower heat platens 34 and 36 are shown as having heating elements 44 encased in the platens. These heating elements 44 may be electrical resistance elements or channels carrying fluid such as hot oil, for example.

At the surface of each heat platen which makes belt contact there are included a series of ridges, corrugations or embossings 46, at least on one platen and preferably on both platens. These ridges or embossings run longitudinally and engage against the belts 12 and 14 with greater pressure than in intermediate areas. FIG. 2 is schematic and somewhat exaggerated as to the relief afforded the ridges 46; their actual height is preferably about ⅛ inch to ⅜ inch from the flat portions 48 of the platens. Therefore, the belts 12 and 14 will normally make some contact with the flat portions 48 of the platens, particularly when food products 32 are sandwiched between the belts, but with less pressure than will exist where the embossings or ridges 46 are positioned. In this way, the food product is thoroughly cooked as it passes through the belt grill, but greater heat transfer occurs where the belt is pressed into the food product surface at the ridges 46. The food product is thus cooked further along these lines at its surface, resulting in grill stripes. The grill stripes are formed on the food products at the location of each ridge 46, while the remainder of the product is also thoroughly cooked.

The ridges or embossings 46 may be formed in the surface of a platen by milling of the metal platen at the locations which will become the flat portions 48, thus leaving the raised ridges 46. Such platens typically are formed of aluminum and can be milled. As an alternative, the ridges can be welded onto a flat surface or the platens can be cast in the desired shape.

As in prior belt grills or belt cookers, the belts 12 and 14 may be formed of a flexible but heat resistant material such as Teflon, and may have glass fiber reinforcement. However, in accordance with this invention the belts may alternatively be formed of DuPont's Kaptron material. Kaptron is a highly heat resistant plastic material which also has good abrasion resistance and heat transfer characteristics. In service in the cooker belts 12 and 14 of this invention, Kaptron belts are capable of greater surface life than Teflon belts.

Figure 3:
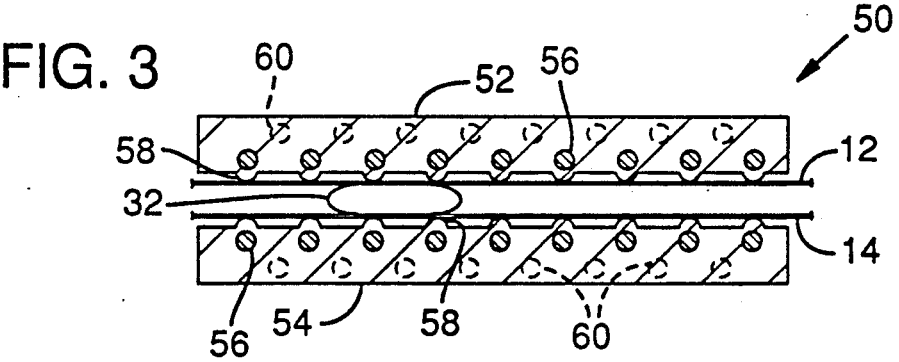
FIG. 3 is a transverse cross sectional view similar to FIG. 2, but showing a modification.

FIG. 3 is a schematic transverse cross sectional view similar to FIG. 2, but showing a modification for use in a commercial device wherein it is desirable to impart the grill marks without cooking the product. For example, this might be desirable before or after precooking of a product to be packaged. In FIG. 3 a modified belt grill striping apparatus 50 has heat platens 52 and 54 dedicated only to the grill striping of the food product 32 between the flexible belts 12 and 14. Thus, heating elements 56 (again, electric resistance elements or hot fluid channels, for example) are positioned in the platen directly adjacent to ridges or embossings 58 which press the belts against the food product to form the grill stripe.

Optionally, additional heating elements 60 may be present in the platens as shown in dashed lines, controllable separately from the dedicated ridge heating elements 56. In this way, all heating elements may be energized together, for both cooking and grill striping of a product simultaneously, or either group can be used exclusively. With only the remotely located heating element 60 energized, cooking and grill striping can be achieved similar to that achieved by the apparatus shown in FIG. 2; with all heating elements used, a heavier grill striping can be achieved from that of the FIG. 2 embodiment, but also depending on the relative temperatures of the elements 56 and 60, the proximity of the elements 56 to the ridges 58, and the height of the ridges 58.

Figure 4:
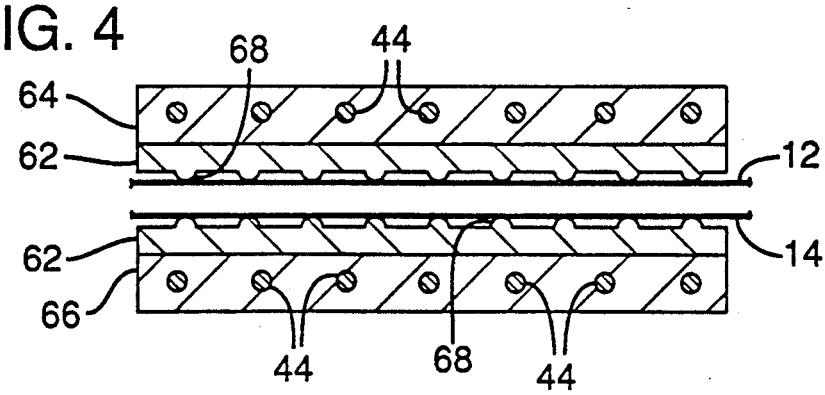
FIG. 4 is another schematic transverse cross sectional view similar to FIG. 2, but showing a further modification.

FIG. 4 is another schematic transverse cross sectional view, indicating that the principles of the invention can be achieved by adding a modification onto the platens of an existing belt cooking apparatus. Since, as noted above, the platens on conventional belt cooking devices can be adjusted as to the degree of separation, heat conducting plates 62 can be secured to the conventional heat platens 64, 66 to provide ridges 68 as discussed above, while still allowing adequate clearance for food products. This may require adjustment of the position of the platens 64, 66 with respect to the belt rollers (16, 18, 24, 26 in FIG. 1) or additional rollers can be added to properly feed the belts 12 and 14 over the plates 62.

FIG. 5 schematically indicates another embodiment of the invention. In FIG. 5 a belt cooking apparatus 70 is shown in transverse cross section, with flexible belts 12 and 14 positioned against the heated surfaces of platens 72 and 74. In this embodiment, no ridges or embossings are included. Instead, a large plurality of heating elements 75, preferably electrical resistance heating elements, are provided in the platens close to the surface which engages the belt 12 or 14. For example, in a belt cooker 70 having a width of about three feet, there might be 100 to 150 separate heating elements 75 closely spaced across the width of the device in each platen.

In order to achieve the grill stripes which are the purpose of the present invention, groups of the heating elements 75 are separately controllable. Thus, if food products are to be cooked uniformly and without grill stripes, all heating elements 75 can be energized to evenly distribute heat into the surface of each food product. However, when grill stripes are to be formed on the surfaces of the products, only every second heating element or every third heating element, for example, can be energized. This will localize the most intense heat to a series of parallel lines passing longitudinally along the platen surfaces, thus forming the desired grill stripes. At the same time, some heat transfer will occur laterally through the platens into the areas where heating elements are not energized, therefore providing heat to cook the food product as well as grill striping the product. m The active elements can be made hotter than in the mode where only cooking is desired, or the belts can be run more slowly, or both.

As an alternative, every second, every third or every fourth heating element can be energized to a high temperature, while intermediate heating elements are energized to a considerably lower temperature. In this way, thorough cooking of each product can be achieved while still forming grill stripes on the surfaces of the product. Such control is easily achieved with electrical resistance heating elements such as Calrods in the platens.

FIGS. 6 and 7 show schematically in perspective alternative embodiments of the invention, wherein metal belts 80 and 82 are used in a belt grill apparatus according to the present invention. In these embodiments, the metal belts, preferably of stainless steel, are strong and highly wear resistant, in addition to having good heat conducting properties. The heat platens for use with these belts 80 and 82 are flat as in prior, conventional belt cooking devices, rather than having ridges or embossings as in the embodiments of FIGS. 2, 3 and 4. The heat platens may be coated with Teflon or Kaptron for lower friction. Grill marks are imparted to the product by ridges, grooves, embossings or corrugations formed in the stainless steel belts 80, 82 themselves. Thus, in the belt 80 of FIG. 6 a series of regularly spaced ridges 84 are formed on the belt, such as by embossing or by milling.

In use on the belt grill, the ridges 84 press directly against the food product and thus engage the food product with greater pressure along these lines, forming the desired grill marks. The product is still thoroughly cooked, by heat transfer not only from the ridges 84 but also from flat spaces 86 between the ridges.

In FIG. 7 the embossings 88 are in the form of brand marks or product trademarks, as selected by the user. FIG. 7 shows diamond shaped brand marks, which can either be solid raised areas or a polygonal perimeter of ridges, so that the perimetral outline of a diamond is formed on the food product.

For increased wear resistance, the stainless steel belt 80 or 82 can comprise a laminate of stainless steel and a temperature resistant, wear resistant plastic such as Teflon or Kaptron. A sheet of stainless steel can be laminated to a film of Kaptron, or between two layers of Kaptron, then put into a die to create rib embossings or corrugations.

FIG. 8 shows a pair of corrugated belts 90, positioned between a pair of heat platens 92 and 94. Corrugations can be about one inch apart, for example. The Kaptron (or Teflon) film can be on the outside surface of the belt, in position to contact the food products, thus making belts easily cleanable; it can be on both surfaces of the stainless steel and also on the platen surfaces if desired, for low sliding friction.

FIG. 9 is a view in transverse cross section, similar to FIG. 2 but showing a modification for trapping of rendered fats on a belt 96, preferably a flexible belt similar to one of those described above. The flexible belt 96, a lower belt in a grill striping belt cooker assembly, is shown positioned over a milled or embossed heat platen 98. In accordance with this embodiment, barriers 100 are positioned on top of the belt 96 near each edge, so that rendered fat liquid is trapped on the surface of the belt 96 and prevented from flowing laterally off the belt. The rendered fat can then be collected as it passes off the belt at the end of the belt's horizontal travel, i.e. at a roller 24 as indicated in FIG. 1. The barriers 100 can comprise Teflon tubing stretched around the belt and in such tension as to cause the tubing to remain against the surface of the belt. The edges of the belt may have provision for retaining the tubing pieces 100 against migration laterally off the belt.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In a belt cooking apparatus or belt grill having a pair of spaced apart opposed heated platens and a pair of endless belts on rollers, positioned such that one of the belts travels adjacent to and against each of the heat platens so as to conduct heat from the heat platens to food products engaged between the belts, and with the two belts advancing at substantially the same speed, the improvement comprising means associated with the belts and platens for effecting increased heat transfer along selected lines on at least one of the belts as compared to remaining areas of the belts, while still providing sufficient heat to cook the food products at such remaining areas of the belts, so as to form grill lines on the food products at the positions of greater heat transfer.

2. A belt cooking apparatus according to claim 1, wherein the means for effecting increased heat transfer comprises ridges or embossings in the surface of at least one of the heat platens, formed in generally longitudinal lines with respect to belt travel, with the belts comprising flexible heat resistant material, so that as the belts travel against the heat platens and in contact with the food products, the ridges or embossings of the heat platens deform the belts and press the belts against the food products with greater pressure than elsewhere on the belt, causing a greater heat transfer to occur along said generally longitudinal lines and thus effecting grill lines on the surfaces of the food products.

3. A belt cooking apparatus according to claim 2, wherein the flexible belt material is comprised of Kaptron.

4. A belt cooking apparatus according to claim 1, wherein the endless belts are formed of stainless steel, and wherein the means for effecting increased heat transfer comprises embossings or raised portions on a surface of at least one of the stainless steel belts, for pressing against the food products to a greater extent than surrounding areas of the belt, thereby effecting greater heat transfer at the embossings or raised portions while still cooking the food product in said surrounding areas.

5. A belt cooking apparatus according to claim 1, wherein each of the stainless steel belts has a heat resistant plastic material laminated to its side facing the food products.

6. A belt cooking apparatus according to claim 5, wherein the heat resistant plastic material is laminated to both sides of each stainless steel belt.

7. A belt cooking apparatus according to claim 1, wherein the means for effecting increased heat transfer comprises a multiplicity of heating elements within at least one of the platens, arranged side by side, closely spaced and parallel, and oriented longitudinally with respect to belt travel, and means (a) for heating only a selected group of said heating elements when desired, to the exclusion of other heating elements between ones of said selected group, so as to conduct heat more intensely into the food products along the selected group of heating elements, comprising said selected lines of increased heat transfer; and (b) for heating all of said heating elements when it is desired to evenly cook food products without grill lines.

8. A belt cooking apparatus according to claim 1, wherein the means for effecting increased heat transfer comprises a multiplicity of heating elements within at least one of the platens, arranged side by side, closely spaced and parallel, and oriented longitudinally with respect to belt travel, and means for selectively energizing a first group of the heating elements to a first, higher temperature for forming grill lines, and for energizing a second group of the heating elements, comprising the remaining heating elements positioned between elements of the first group, to a second, lower temperature for cooking the food products, whereby heat is conducted more intensely into the food products along the first group of heating elements, comprising said selected lines of increased heat transfer, than along the second group of heating elements.

9. A belt cooking apparatus according to claim 1, wherein the lower belt includes openings in the belt for allowing rendered fat liquid to fall through the belt as the belt passes beyond the lower heat platen, and including a rendered fat collection tray positioned below the lower belt to catch the rendered fat droppings.

10. A belt cooking apparatus according to claim 1, further including barrier means at the edges of the lower belt, for preventing rendered fats on the lower belt from falling laterally off the belt.

11. In a belt cooking apparatus or belt grill having a pair of spaced apart opposed heated platens and a pair of endless belts on rollers, positioned such that one of the belts travels adjacent to and against each of the heat platens so as to conduct heat from the heat platens to food products engaged between the belts, and with the two belts advancing at substantially the same speed, the improvement comprising the belts being formed of stainless steel, and at least one of the stainless steel belts having a surface with a plurality of raised portions or embossings positioned to engage the food products with greater pressure than at the remaining areas of the belt, whereby increased heat transfer to food products is effected at said raised portions or embossings as compared to remaining areas of the belts while still providing sufficient heat to cook the food products at such remaining areas of the belts, so as to form grill lines on the food products at the locations of the raised portions or embossings.

* * * * *